Patented Dec. 9, 1930

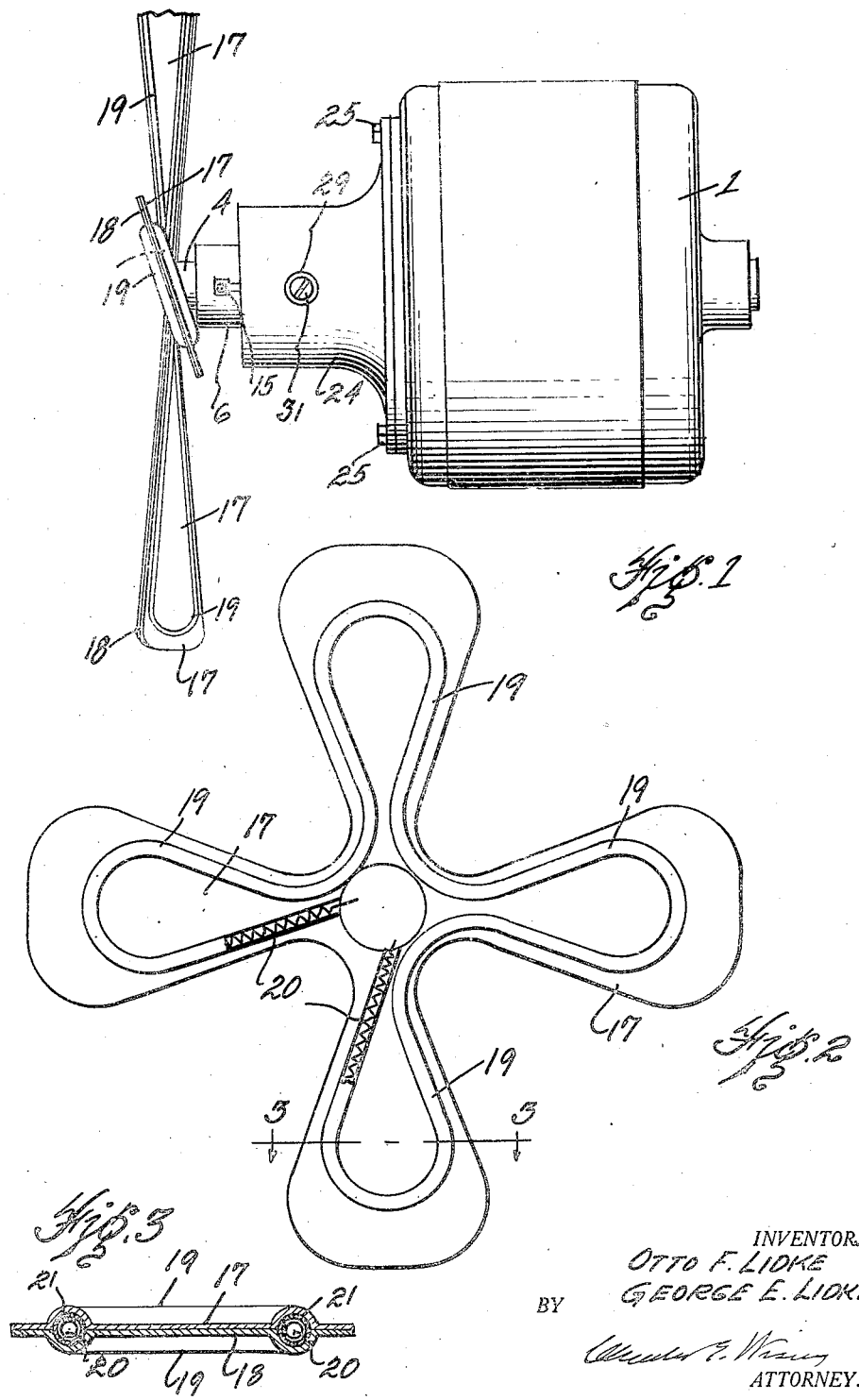

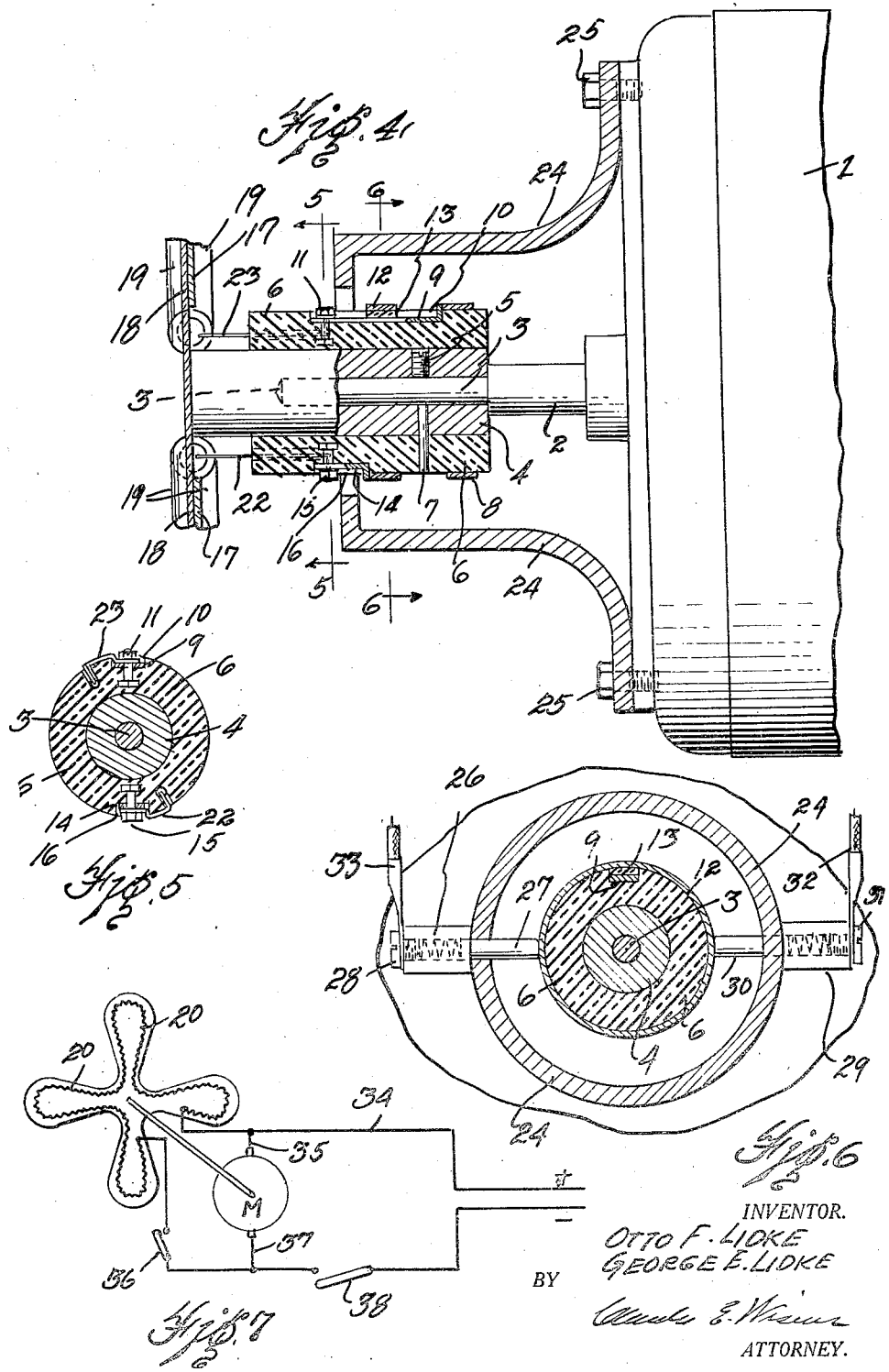

1,784,528

UNITED STATES PATENT OFFICE

OTTO F. LIDKE AND GEORGE E. LIDKE, OF DENTON, MICHIGAN; SAID OTTO F. LIDKE ASSIGNOR OF ONE-FOURTH TO LEE A. YODER, OF ROMULUS, MICHIGAN

ELECTRIC HEATING APPARATUS

Application filed October 4, 1929. Serial No. 397,175.

This invention relates to electric heating apparatus and the object of the invention is to provide a device for producing a flowing stream of heated air.

Another object of the invention is to provide an electric heating apparatus comprising an electric motor and an electrically heated fan driven thereby, the fan heating the air and producing a current of heated air to any point to which the flow is directed.

A further object of the invention is to provide a fan formed of two sheet metal halves secured together, the said sheet metal halves being formed to provide a continuous conduit therebetween in which the electrical heating element is mounted.

Another object of the invention is to provide a motor driven electrically heated fan in which the heating element in the fan is energized by the electric motor circuit.

A further object of the invention is to provide a means for heating the blades of the fan so that the air coming in contact with the blades is heated as it is blown outwardly by the blades.

These objects and the several novel features of the invention are hereinafter more fully described and claimed and the preferred form of construction by which these objects are attained is shown in the accompanying drawings in which—

Fig. 1 is a side elevation of an electric heating apparatus embodying our invention.

Fig. 2 is a front elevation of the fan, partly broken away to show the heating element.

Fig. 3 is a section taken on line 3—3 of Fig. 2.

Fig. 4 is an enlarged section through the brush housing.

Fig. 5 is a section taken on line 5—5 of Fig. 4.

Fig. 6 is a section taken on line 6—6 of Fig. 4.

Fig. 7 is a diagrammatic view of the circuit for the motor and the fan heating element.

As shown in Figs. 1 and 4 an electric motor 1 is provided having a shaft 2 driven by the motor. This shaft 2 is provided with a terminal end 3 of smaller diameter and a metal hub 4 is secured to the portion 3 of the shaft by the set screw 5. An insulating sleeve 6 is positioned over the metal hub 4 and is secured thereto by the pin 7 as shown in Fig. 4. A contact ring 8 is secured to the outer surface of the insulating sleeve 6 and a contact strip 9 leads through the bottom of a groove 10 in the surface of the insulating sleeve 6 to the contact 11 secured in the insulating sleeve 6. A second contact ring 12 extends about the sleeve 6 in spaced relation with the contact ring 8 and an insulating block 13 is positioned in the groove 10 between the contact ring 12 and the contact strip 9 to prevent electrical contact between these two members.

A contact strip 14 connects the contact ring 12 with the contact 15 mounted in the insulating sleeve 6 and extends through a groove 16 in the said sleeve. The fan, as shown in Figs. 1, 2 and 3 is formed from two sheet metal plates 17 and 18 which are secured together by welding and are formed to provide a continuous conduit or channel 19 therebetween. As will be noted from Fig. 2 this conduit 19 is continuous from the center of the fan about the respective blades and back to the center of the fan. The heating element consists of a continuous coiled resistance wire 20 wound within a flexible insulating tube 21 and the heating element thus assembled is positioned in the continuous conduit 19 between the halves 17 and 18 of the blades. The opposite ends of the heating element are brought to the center of the fan and extend through openings provided therefor in one of the plates. The center of the fan is welded to the end of the metal hub 4 as shown in Fig. 4. A wire 22, shown in Fig. 4, is connected at one end to the contact 15 and leads through an aperture provided therefor in the insulating sleeve 6 as shown in Fig. 5, to one end of the heating element. A similar wire 23 is provided leading through an aperture provided therefor in the insulating sleeve 6 from the contact 11 to the opposite end of the heating element as shown in Figs. 4 and 5.

A brush housing 24 of insulating material is secured to the motor housing 1 by the bolts 25, shown in Figs. 1 and 4. As shown in Fig. 6, a bracket 26 is secured to the brush housing 25 in alignment with the contact ring 12 and a spring pressed brush 27 extends through this bracket into contact with the contact ring 12. The spring tension is adjustable by means of the screw 28 and a circuit terminal 33 is connected to this screw. A similar bracket 29 is secured to the brush housing 24 diametrically opposite the bracket 26 and in alignment with the contact ring 8. A spring pressed brush 30 extends through this bracket 29 into contact with the contact ring 8. The spring is adjustable by a screw 31 to which the circuit terminal 32 is connected.

The current flow is through the circuit terminal 33 and bracket 26 and thence through the brush 27 to the contact ring 12 shown in Fig. 6. From the contact ring 12 the current flows through the contact strip 14 to the contact 15 and thence through the wire 22, shown in Fig. 4, to the fan heating element 20. The current flows through the fan heating element 20 and through the wire 23 to the contact 11 and thence through the contact strip 9 to the contact ring 8. From the contact ring 8 the current flows through the brush 30, shown in Fig. 6, and through the bracket 29 to the circuit terminal 32.

The electric circuit for both the motor and the fan is shown in Fig. 7. In this circuit the positive electric conduit 34 is connected to the motor by the conduit 35 and the end of the conduit leads to the fan heating element 20. The negative conduit leads from the fan heating element 20 to the heating element switch 36 and thence to the motor conduit lead 37 and to the motor switch 38 and thence to the source of current supply.

When the switch 36 is closed, the closing of the switch 38 energizes both the motor circuit and the fan heating element circuit to set the entire device in operation. If it is desired to utilize the fan without energizing the heating element the switch 36 is opened at which time the motor will drive the fan without heating the air blown by the fan.

It will be noted that by enclosing the heating element within the fan blade, the heating element does not come in direct contact with the air but will heat the surface of the fan blades evenly and by enclosing the heating element in the blades the heating element can not be easily damaged or short circuited.

From the foregoing description it becomes evident that the device is very simple and efficient in operation, will not easily get out of order, will provide a means for producing a heated current of air and provides a device which accomplishes the objects described.

Having thus fully described our invention, its utility and mode of operation, what we claim and desire to secure by Letters Patent of the United States is—

1. In an electric heating apparatus, an electric motor, a brush housing secured to the electric motor, a pair of brushes connected in the electric motor circuit and mounted in the brush housing, an insulating sleeve secured to the motor shaft, a pair of contact rings mounted on the insulating sleeve and contacted by the said brushes, a fan secured to the motor shaft and formed from two sheet metal plates secured together in face to face relation, the plates being formed to provide a continuous conduit therebetween extending into each blade of the fan, the ends of the continuous conduit terminating adjacent the fan center and opening through one of the plates, an electric heating element extending throughout the length of the continuous conduit, the opposite ends of the heating element extending through the terminal openings in the continuous conduit and being connected to the contact rings on the insulating sleeve.

2. In an electric heating apparatus, an electric motor, a fan secured to and rotatable with the electric motor shaft, the fan being formed from two sheet metal plates secured together in face to face relation, each plate being formed with a continuous channel extending into each blade of the fan, the plates being secured together with the channels opening toward each other to form a continuous conduit between the plates, the opposite ends of the conduit terminating adjacent the fan center and opening through one of the plates, an electric heating element extending throughout the length of the continuous conduit and the electric heating element being connected in the electric motor circuit through the openings in the terminal ends of the continuous conduit.

3. In an electric heating apparatus, a fan formed from two sheet metal plates secured together in face to face relation, each plate being formed with a continuous channel extending into each blade of the fan, the plates being welded together with the channels opening toward each other to form a continuous conduit between the plates, the ends of the conduit terminating adjacent the fan center, a flexible insulating tube positioned in and extending throughout the length of the continuous conduit, and an electric heating element extending through the insulating tube.

4. In an electric heating apparatus, a fan formed from two sheet metal halves secured together in face to face relation, each half being formed with a continuous channel leading into each blade of the fan and the channels forming a continuous conduit when the fan halves are secured together in face to face relation and an electric heating element mounted in the conduit between the fan halves and insulated from the fan halves.

5. In an electric heating apparatus, a fan formed from two sheet metal halves secured together, each half being formed with a continuous channel extending into each blade of the fan and the channels forming a continuous conduit when the fan halves are secured together and an electric heating element mounted in the conduit between the fan halves.

6. In an electric heating apparatus, an electric motor, a fan adapted to be driven by the electric motor, the fan being formed with a continuous conduit therein, the opposite ends of the conduit terminating adjacent the center of the fan, and an electric heating element mounted in the said conduit.

In testimony whereof we sign this specification.

OTTO F. LIDKE.
GEORGE E. LIDKE.